*INVENTOR*
CHARLES BARTON ALBRIGHT

United States Patent Office 3,421,798
Patented Jan. 14, 1969

3,421,798
SHEET ITEM TURNAROUND DEVICE FOR A SHEET HANDLING SYSTEM
Charles Barton Albright, Norristown, Pa., assignor to Sperry Rand Corporation, New York, N.Y., a corporation of Delaware
Filed Aug. 4, 1966, Ser. No. 570,298
U.S. Cl. 302—29          6 Claims
Int. Cl. B65g 53/04; B65h 29/32

ABSTRACT OF THE DISCLOSURE

The present device provides a spur passageway in a fluid transport mechanism which acts to move items therewithin. The spur passageway is formed in the mirror image of the letter C, if the transport mechanism is carrying cards from left to right. The spur passageway has apertures located along all sides and from these apertures there are jets of air emitted into the spur passageway. Some of the jets of air act to propel, or move items, passing through the spur passageway around its half loop while other jets act to simply cushion, or buoy up, the items being so moved.

---

This invention relates to a sheet handling device which employs an all-fluid transport technique. More particularly, this invention relates to a turnaround mechanism which is used with a transport device through which unit records are transported and which is used to re-route unit record items in the course of their movement, in order that such items may be removed from said transport device and ultimately stacked for further processing.

In the vast majority of sheet handling devices such as punch card system and/or magnetic ink check reading devices, etc., it is necessary to remove the feed items or the checks from the means by which they are being transported (in the process of being sorted, collated, reproduced, tabulated, etc.). It has been found to be advantageous to remove the feed items from such a transport device in such a way that the items can be reprocessed through the same machine or a machine that has a similar feeding mode of operation. In other words, if a unit record at the top of a stack of such unit records enters a transport mechanism with its face up, then it should be stacked such that when the cards are removed and flipped over (as a stack), the same top unit record will be on the top of the stack, with its face up.

In the prior art such sheet handling devices involved rollers, deflector blades and card stacker plates all of which came in contact with the feed item itself. For instance, in the ordinary business machine sorter, the cards are initially selected to ride between two chute blades which ultimately lead the punch cards to a deflection portion thereof and other deflecting blades which force the card into a stacking mechanism. The device with which the present system is used is a means for transporting a sheet item, such as a punch card, a unit record or the like, with an all-fluid technique, that is to say such a unit does not come in contact with rollers or deflector blades or hardware as employed in the prior art. Accordingly, the removal of such unit records from a transport means, employing an all-fluid technique, requires that the unit records be subjected to differentials in the fluid pressure in order to direct the item into a turnaround mechanism and ultimately into a stacker.

In accordance with the present invention there is provided a unit record spur passageway means which resembles the mirror image of the letter C, i.e., for a transport mechanism in which the cards are conducted from left to right. The spur passageway leads from a main passageway and has holes along all four sides. The sides of the spur passageway which lie adjacent the top and bottom faces of a unit record being carried therethrough provide, at the proper locations, air jets for propulsion and air jets for an air bearing effect. The holes which lie adjacent the edges of the unit records act to draw the air from the passageway and hence enable an incremental movement of a unit record in response to the above-mentioned propulsion air jets.

The present invention can be better understood by considering the following text and the drawings in which.

The present invention relates to a unit record turnaround station of a sheet handling system which employs an all-fluid transport technique. Such an overall system is described in my co-pending application, "Sheet Handling System Employing an All Fluid Transport Technique," Ser. No. 570,304, filed Aug. 4, 1966.

Figure 1:
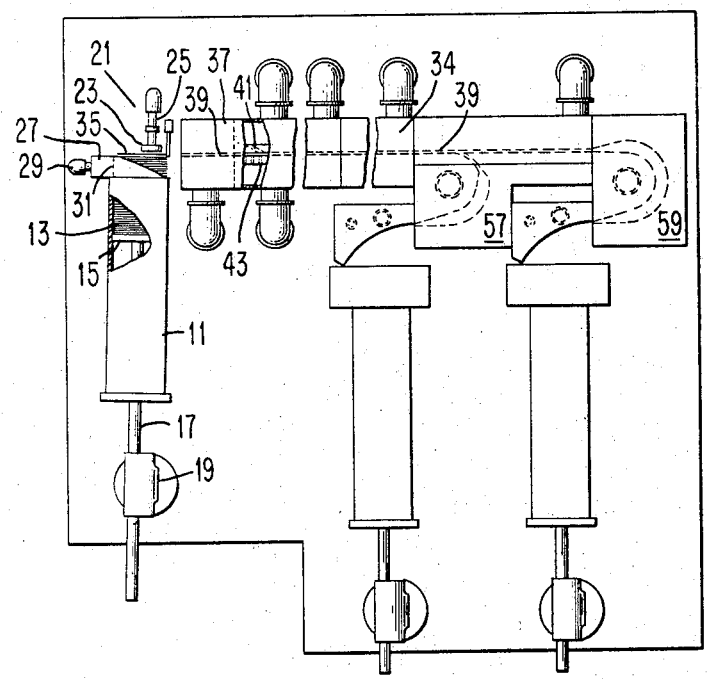
FIGURE 1 is a schematic and partially broken-away pictorial of the overall system in which the present invention is used.

In order to have an overall understanding of the role that the present invention plays in the above-mentioned sheet handling mechanism, examine FIGURE 1 which is a schematic of such an overall device. It should be noted that while the present invention may be used with sheet handling mechanisms, or document handling mechanisms, the present invention is herein described as a unit record handling device.

In FIGURE 1 there is shown a unit record magazine 11. The unit records 13 are pushed upwardly in the magazine 11 by lifting plate 15. The lifting plate 15 is driven by shaft 17 which in turn is moved upward by a suitable mechanism 19. The suitable mechanism 19 may be a cam driven device for a worm screw device, etc., which in effect will cause lift plate 15 to provide a constant movement of the unit records 13 toward the upper portion of the magazine 11.

In proximity to the upper extremity of the magazine 11, there is found a separator mechanism 21 which is composed of a pressure head 23 and a hollow feed-in tube 25. In addition, at the upper extremity of the magazine 11 there is provided a pre-separator device 27 which is actually U-shaped and fits around the magazine 11 as described in my above-mentioned co-pending applications.

The preseparator 27 has air, under pressure, fed thereto through the inlet tube 29. In the preseparator device 27 there are apertures in the rearward wall 31 and in the two side walls, neither of which side walls is shown in FIGURE 1. The air which emanates from these last-mentioned apertures riffles the upper positioned unit records and helps in the separation thereof.

From the pressure head 23 there emanates a jet of air in a downward vertical direction normal to the plane of the unit record, which is supplied through the tube 25 from a suitable air pressure source (not shown). As this air from the pressure head 23 strikes the topmost unit record, it creates a differential of pressure as it experiences a radial excursion. The differential of pressure thus created is not sufficient to lift the top unit record until the lifting plate 15 moves the entire stack to a position where the static pressure of the air, moving radially from the downward vertical jet, reaches a critical low point. At this point the pressure differential across the upper and lower surfaces of the top unit record causes such record to snap up toward the underside of the pressure head 23 and come to a state of equilibrium within a few thousandths of an inch below the surface of pressure head 23.

As can be seen in FIGURE 1, the stack of unit records is inclined toward the transport mechanism 23. Accordingly, the top unit record 35 will be urged by the force of gravity towards the entrance of the accelerator 37. Within the accelerator station 37, as more fully described in my co-pending application, "All Fluid Unit Record Accelerator," Ser. No. 570,312, filed August 4, 1966, there is provided a number of angularly disposed holes which provide jets of air having a forward component of force (into the pasageway 39). Since the jets of air are projected into said passageway at an angle, there is provided a component of force which will move a unit record being fed therethrough in a forward direction. Because these jets of air are projected in a forward sense into the passageway 39 and the entrance to the accelerator opens into the surrounding atmosphere, there is a differential of pressure created between the pressure in the passageway and the ambient pressure around the entrance to the accelerator. The differential pressure between the pressure in the passageway and the ambient pressure around the entrance of the accelerator is further increased by the use of suction holes (46) in the side (vertical) walls of the passageway entrance area. Accordingly, there is a second force urging the top unit record 35 into the accelerator. Finally, the air stream from the preseparator 27 which is transmitted through the back wall 31, aids in urging the top unit record into the entrance of the accelerator 37.

Figure 3:
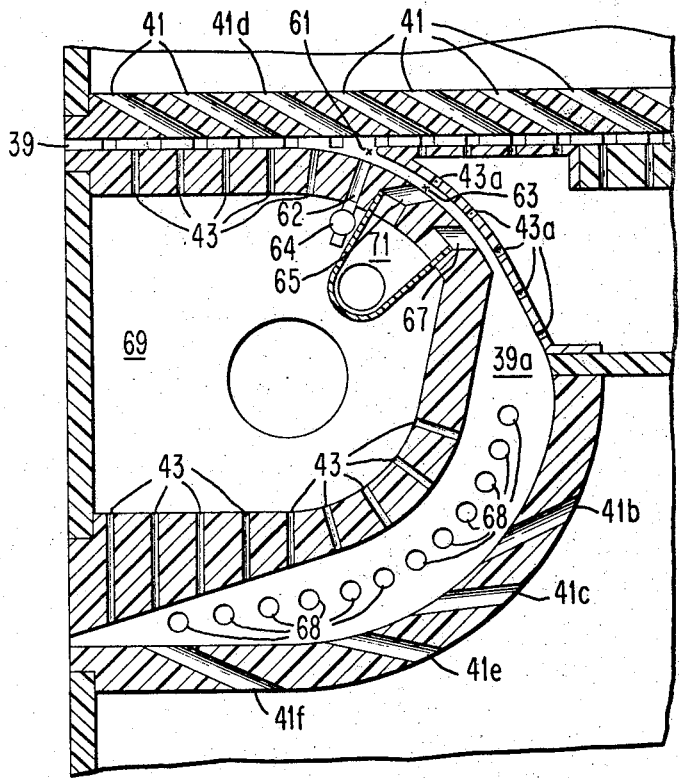
FIGURE 3 shows a turnaround device to be used with a plurality of such turnaround devices and with means to intercept a unit record in the course of its excursion through the main passageway of the system.

It suffices to say, for purposes of this discussion, that in the accelerator 37, the unit record is moved along by mass air flow created by incrementally spaced propulsion jet streams. The incrementally spaced propulsion jet streams are provided by the angularly located holes, such as holes 41, which can be seen in FIGURE 3. In addition, there is a set of jets, directed approximately normal to the plane of the unit record, provided by the holes 43, as also can be seen in FIGURE 3. The vertically directed jets act as an air bearing means upon which the unit record is cushioned during its excursion. The forward component of force of the propusion jets passing through the holes 41 propels a document or unit record toward the right-hand side of the figure (as defined in FIGURE 3).

Figure 2:
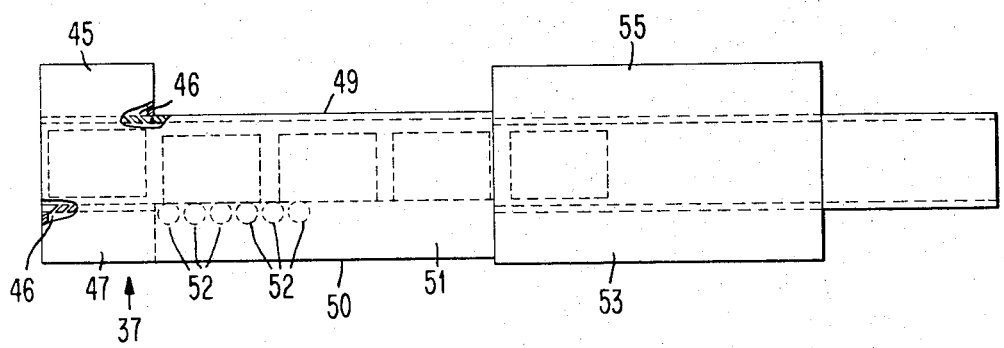
FIGURE 2 is a top plan view of a portion of FIGURE 1.

Consider FIGURE 2 which is a top view of the transport means 33 shown in FIGURE 1. In FIGURE 2 it can be seen that the accelerator station 37 has two plenum chambers 45 and 47, each of which has a negative pressure developed therein. Accordingly, as the air emanates from the holes 41 and 43, one each of which can be seen in FIGURE 1, it is sucked from the main transport passageway 39 into the plenum chambers 45 and 47, through the holes 46 some of which are shown in chambers 45 and 47. It is to be understood that the holes 46 extend all along the sides of the passageway 39 excepting the side 49 which is part of the alignment and the read stations, for reasons described in my co-pending application "Sheet Item Alignment Device For Sheet Handling System," Ser. No. 570,303, filed Aug. 4, 1966.

As mentioned above, the unit record is transported on a cushion of air from the holes 43 which are positioned along the entire main passageway 39, the unit records are "pushed" through the passageway 39 by the jets of air from the holes 41 which also lie along the entire passageway 39. The air pressure applied to the propulsion jet apertures 41 is greater than the air pressure applied to air bearing holes 43. The air from the jets 43 and 41 is sucked from the chamber 39 through holes 46 which extend into the negative pressure plenums 45 and 47 and their counterparts in the alignment station, read station and turnaround stations. The complete the thought with respect to FIGURE 2, it should be understood the plenums 51, 53, and 55 are also chambers in which a negative pressure is developed.

As was described in my last-mentioned co-pending application, as the record leaves the accelerator station it is moved as depicted in FIGURE 2 toward the side 50 whereat it is aligned by the turbines 52. In one embodiment, the unit record may still be under acceleration during the initial phase of alignment since these two operations can be done simultaneously in the interest of increasing the unit record rate handling capacity of the device. Suffice it to say here that the unit records are so aligned that when they go through the read station 34 they can be read in registration. When the unit records leave the read station 34 they move into an offset portion of the passageway 39 which really provides a means for placing the unit record in the middle of the passageway. It is in this offset portion that the turnaround stations with which the present invention is involved are located.

Figure 4:
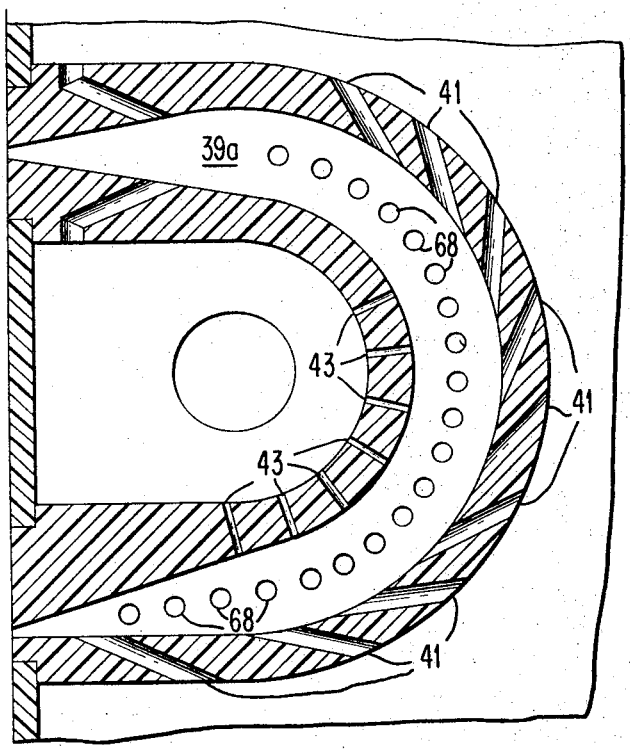
FIGURE 4 is a second embodiment of a turnaround device.

Imagine that the turnaround station depicted in FIGURE 3 is in fact found at the turnaround station 57 of FIGURE 1, while a turnaround station similar to FIGURE 4 is found at the turnaround station 59 in FIGURE 1. In FIGURE 3 as the unit record is transported along the passageway 39 it approaches the point 61. At the time that it approaches the point 61 if there is sustaining air pressure, i.e., a jet of air emanating from the vertical control station hole 62 the unit record will pass beyond the turnaround station 57 (FIG. 1) toward the turnaround station 59 (FIG. 1). However, if there is no air jet emanating from the hole 62 the air jet from the hole 41d would force the edge of the unit record into the spur passageway 39a. As the unit record enters the spur passageway 39a it is incrementally propelled along by the propulsion jets of air from the angularly located holes 41 including 41d. When the unit record reaches the point 63 it is once again subjected to the bearing air pressure from the first of vertical holes 43a, as well as the propulsion air from the angular hole 65. Accordingly, the unit record is urged through the spur passageway 39a moving on an air cushion as provided by the bearing air holes 43a and being propelled by the propulsion jet from the holes 65 and 67.

When the unit record travels into the wider portion of the spur passageway 39a, it is urged in a downward direction by the forces of gravity and ultimately its leading edge comes in contact with the propulsion jet from the angular hole 41a. In incremental fashion in response to the further propulsion jets 41b, 41c, 41e, and 41f, the unit record is pushed around the large curve of the spur passageway 39a. It should be clear that during this urging around the curve of the spur passageway 39a, the unit record is cushioned by the bearing air jets from the vertical holes 43 on the lower portion of the turnaround device.

It follows that the unit record which was travelling along the main passageway 39 with its face upward toward the angular hole 41 is turned around as previously described, so that when it moves by the propulsion jet 41f its face is downward toward the bottom of the turnaround mechanism.

It should be noted, as depicted in FIGURE 3, that a portion of the bearing air pressure chamber 69 is cut out to provide a propulsion chamber 71 which supplies propulsion jets the angular holes 63 and 67. As stated earlier the air pressure applied to the propulsion jets is greater than the air pressure applied to the air bearing jets. Hence, there is provided a propulsion chamber 71. Further shown in FIGURE 3 are the side ports 68 which lead to ambient atmospheric pressure. The side ports 68 are analogous to the side ports 46 shown in FIGURE 2. The side ports 68 function to convey the air which is fed from the propulsion jets 41 including 41a, 41b, 41c, 41e and 41f, 63 and 67 and the bearing air jets 43 and 43a out of the spur passageway 39a at incremental steps so that the unit record is in fact urged along incrementally.

FIGURE 4 shows another embodiment of the turnaround mechanism shown in FIGRE 3. It will be noted in FIGURE 4 that the spur path 39a is more symmetrical than that shown in FIGURE 3 and this is possible because the turnaround mechanism in FIGURE 4 is not required to perform with a control jet.

It should be further noted in FIGURE 3 that the control station 62, or hole 62, is controlled by a suitable valve device 64. The valve device 64 may be a fluid operated switching means, or may be a mechanical device which simply opens and shuts either pneumatically or electrically under the control of the read station 34.

The present invention provides a means for interrupting the travel of a sheet item along its path. Further the sheet items are redirected so as to be turned around and ultimately stacked for re-use and the medium by which the foregoing is accomplished in a mass air flow.

The embodiment of the invention in which an exclusive property or privilege is claimed are defined as follows:

1. A sheet item processing system which employs an all fluid transport technique and has a main passageway therethrough including a sheet item turnaround device comprising in combination:
   (a) air pressure means;
   (b) support apertures located in the base of said main passageway and connected to said air pressure means to provide jets of air from said base which act to support sheet items passing therealong;
   (c) advance apertures located in the upper wall of said main passageway and connected to said air pressure means to provide jets of air from said upper wall which act to advance sheet items passing therealong;
   (d) spur passageway means having an entrance portion means connected to said main passageway and an exit portion means formed to direct a sheet item, passing therethrough, along an arcuate excursion so that the surface of said sheet item which faced upward when it entered said passageway will be the surface which faces downward at the end of said arcuate excursion;
   (e) controllable air jet means connected to said air pressure means located at said entrance portion to act in two modes, the first mode being to sustain a sheet item passing along said main passageway as it approaches said entrance portion to cause said sheet item to be non-selected and alternately to refrain from providing a jet of air to sustain a sheet item passing along said main passageway as it approaches said entrance portion whereby said sheet item is forced into said spur passageway by jets of air emanating from said advance apertures and thus enters said spur passageway, thereby being selected.

2. In a sheet item processing system which employs an all fluid transport technique and has a main passageway therethrough, a sheet item turnaround device according to claim 1 wherein said spur passageway means comprises a convex wall, a concave wall, and two side walls and wherein said concave wall has angularly formed apertures therein adapted to provide propulsion jets of air and vertically formed apertures therein adapted to provide air bearing jets of air.

3. In a sheet item processing system which employs an all fluid transport technique and has a main passageway therethrough, a sheet item turnaround device according to claim 2 wheren said air pressure means comprises at least first and second sources of air pressure, said first source providing air pressure having a substantially larger value than said second source and wherein said angularly formed apertures of said convex wall are connected to said first source of air pressure and wherein said vertically formed apertures in said concave wall are connected to said second source of air pressure.

4. In a sheet item processing system which employs an all fluid transport technique and has a main passageway therethrough, a sheet item turnaround device according to claim 2 wherein said concave wall has angularly formed apertures adapted to provide propulsion jets of air therefrom and vertically formed apertures to provide bearing air jets therefrom and wherein said air pressure means comprises at least first and second sources of air pressure wherein said first source of air pressure is substantially greater than said second source of air pressure and wherein said first source is connected to said angularly formed apertures and said second source is connected to said vertically formed apertures.

5. In a sheet item processing system which employs an all fluid transport technique and has a main passageway therethrough, a sheet item turnaround device according to claim 4 wherein said side walls have apertures therein which connect said spur passageway with the ambient atmosphere for exhausting free air from said spur passageway.

6. In a sheet item processing system, which employs an all fluid transport technique and has a main passageway therethrough, a sheet item turnaround device according to claim 2 wherein said angularly formed apertures in said convex wall are located along said convex wall toward said entrance portion and wherein vertically formed apertures in said convex wall are located along said convex wall toward said exit portion and wherein said convex wall has a plurality of vertical apertures therethrough located toward said entrance portion and wherein said concave wall has angularly formed apertures therethrough located along said concave wall towards said exit portion and wherein said air pressure means comprises at least first and second sources of air pressure, said first source providing an air pressure having a substantially larger value than said second source, and wherein said angularly formed apertures are all connected to said first source of air pressure and said vertically formed apertures are all connected to said second source of air pressure.

References Cited

UNITED STATES PATENTS

| 3,236,517 | 2/1966 | Lyman | 271—5 |
| 3,243,181 | 3/1966 | Lyman | 271—74 |

FOREIGN PATENTS

| 897,194 | 5/1962 | Great Britain. |
| 932,446 | 7/1963 | Great Britain. |

RICHARD E. AEGERTER, *Primary Examiner.*

U.S. Cl. X.R.

271—74